Jan. 19, 1932.  R. VON MATTEKOVICH  1,842,277
APPARATUS FOR ATTACHMENT TO BOILERS FOR THE COMBUSTION
OF WET FUEL SUCH AS MEGASS AND THE LIKE
Filed Dec. 27, 1928    7 Sheets-Sheet 2
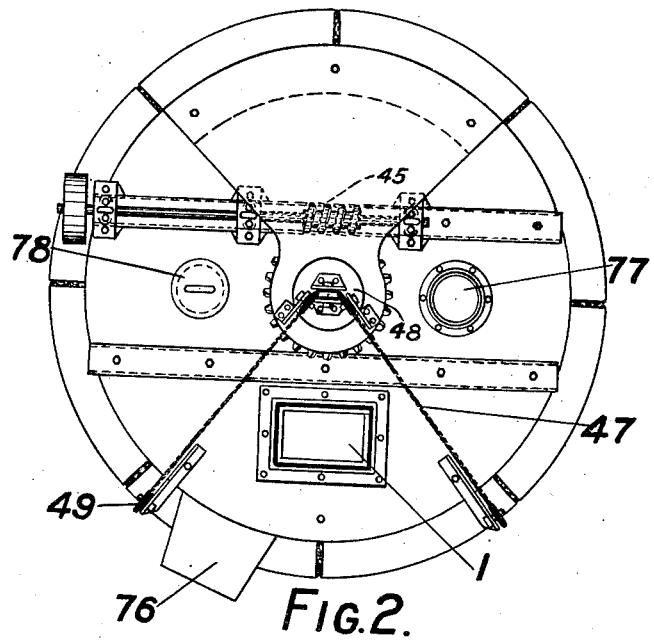
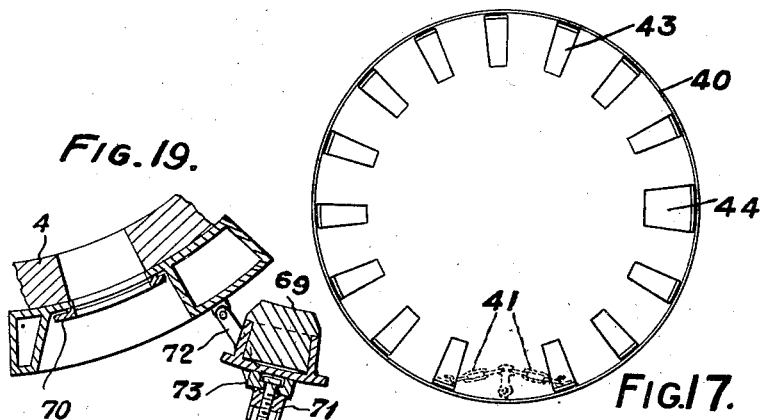
Inventor:
Rudolf von Mattekovich
By
Attorney Jan. 19, 1932.  R. VON MATTEKOVICH  1,842,277
APPARATUS FOR ATTACHMENT TO BOILERS FOR THE COMBUSTION
OF WET FUEL SUCH AS MEGASS AND THE LIKE
Filed Dec. 27, 1928  7 Sheets-Sheet 3

INVENTOR.
R. von Mattekovich
BY
Emil Bönnelycke
ATTORNEYS

Jan. 19, 1932. R. VON MATTEKOVICH 1,842,277
APPARATUS FOR ATTACHMENT TO BOILERS FOR THE COMBUSTION
OF WET FUEL SUCH AS MEGASS AND THE LIKE
Filed Dec. 27, 1928 7 Sheets-Sheet 4

INVENTOR.
R. von Mattekovich

Jan. 19, 1932.  R. VON MATTEKOVICH  1,842,277
APPARATUS FOR ATTACHMENT TO BOILERS FOR THE COMBUSTION
OF WET FUEL SUCH AS MEGASS AND THE LIKE
Filed Dec. 27, 1928  7 Sheets-Sheet 5

INVENTOR.
R. von Mattekovich
BY
Emil Bonnelycke
ATTORNEYS.

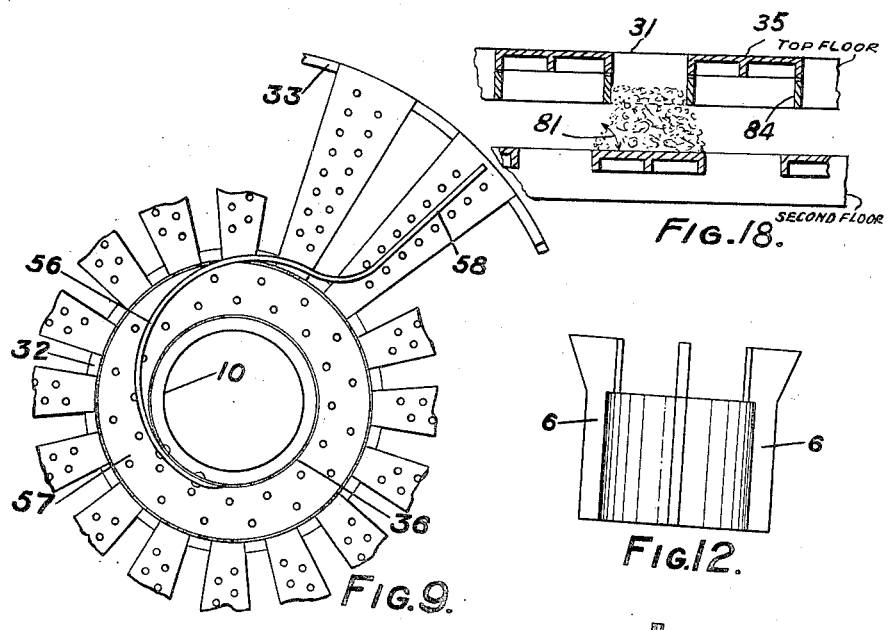

Patented Jan. 19, 1932

1,842,277

UNITED STATES PATENT OFFICE

RUDOLF VON MATTEKOVICH, OF AUCHENFLOWER, NEAR BRISBANE, QUEENSLAND, AUSTRALIA

APPARATUS FOR ATTACHMENT TO BOILERS FOR THE COMBUSTION OF WET FUEL SUCH AS MEGASS AND THE LIKE

Application filed December 27, 1928. Serial No. 328,746.

This invention is for an improved apparatus, for attachment to a boiler, for the combustion of wet fuel such as megass sawdust and the like, for heating the said boiler.

Very considerable quantities of megass, a by-product of sugar mills, is available for fuel and contains good heating properties for boilers when efficiently burned in furnaces. It is the general practice to utilize this by-product for steam raising purposes in sugar mills, but difficulty is found in economically effecting a good combustion of the green megass in the condition it leaves the rollers. The megass is in a very wet state, and it is usually necessary to assist the combustion with other fuel and to use means in the furnaces for preventing the megass from settling down on the fire grate bars.

Generally a very strong forced draught must be used in order to force air for combustion through the thick bed of wet fuel, resulting in an enormous increases of waste gases, and causing a considerable percentage of unconsumed fuel to escape into the atmosphere.

The object of this invention is to provide apparatus for handling the green megass or the like, distributing it evenly and heating it prior to its entry to an ignition chamber, preparatory to the hot fuel and gases passing to the boiler furnace, and enabling the combustion to be carried on effectually with the least possible excessive air.

In order that the invention may be better under stood reference will be had to the accompanying drawings wherein like reference numerals denote the same parts in the different figures and wherein—

Figure 2 is a plan of the same.

Figure 9 is a part section showing the slicer on the top of the desiccator.

Figure 10 is a part plan showing the scraper located above the ledge on the bottom floor of the desiccator.

Figures 11, and 12 are detail views of central pedestal.

Figures 13, 14 and 15 are detail views of the revolving scrapers.

Figure 16 is a diagrammatic view of the revolving scrapers.

Figure 17 is a detail view of the regulator.

Figure 18 is a detail sectional view of part of the two top floors of the desiccator.

Figure 4:
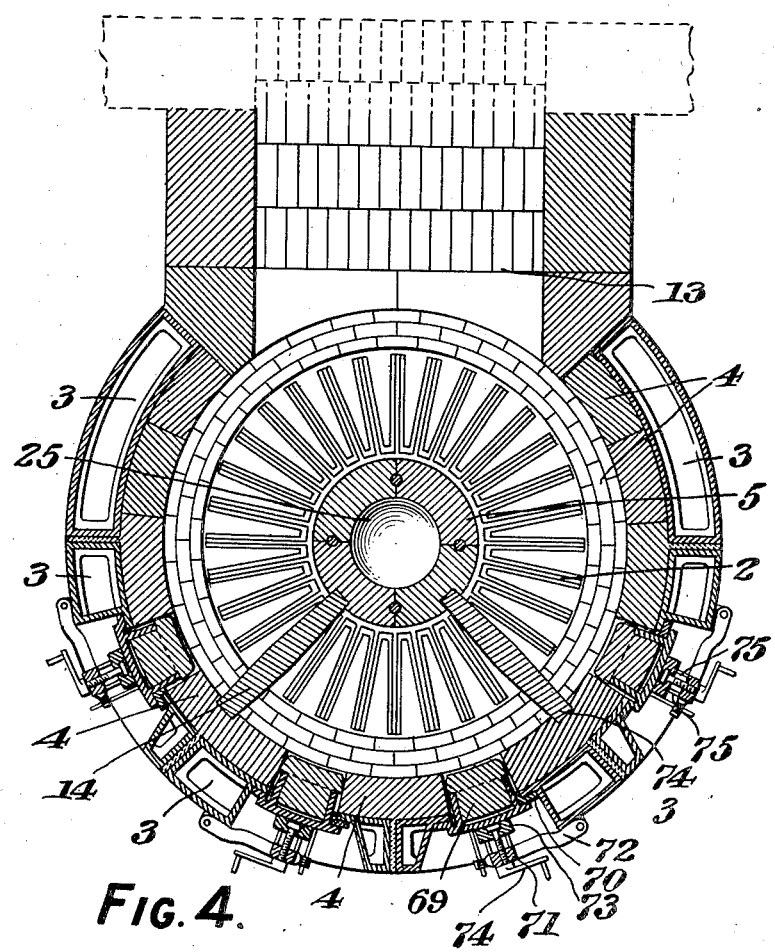
Figure 4 is a horizontal section through the doors.

Figure 19 is a detail sectional view of part of the structure shown in Figure 4, with the door in open position.

The apparatus consists of a vertical retort of cylindrical shape, comprising upper and lower compartments. The upper compartment (the desiccator) is distinct from the lower compartment (the ignition chamber); the former receiving the megass through a chute 1 from the conveyor and finally delivering it into the lower chamber. On its passage through the upper chamber the megass is dried by progressive heating, and its moisture content evaporated and converted into super heated steam. Entering the lower chamber the megass readily ignites; the finer particles are consumed before reaching the bottom, whereas the coarse particles continue burning on the fire-grate 2 until completely consumed.

The containing wall of the whole apparatus, with the exception of the lower portion, surrounding the ash-pit, is constructed by means of air-jackets 3, securely joined together. No stays are required, the jackets 3 forming a solid and compact (cylindrical) casing of sufficient weight to ensure stability. The jackets 3 surrounding the ignition chamber, are lined with fire-bricks 4; between these bricks 4 and the walls of the jackets 3 a layer of heat insulating tiles (not known) may be inserted.

The casing is axially penetrated by a hollow, cylindrical structure, supported by a heavy cast-iron pedestal 6 on a concrete pillar. The lower portion of the structure, extending throughout the ignition chamber is composed of rings of fire-resisting material 5, topped off with a substantial cast-iron ring 9. The ring 9 provides a secure joint of the bricked part of the flue with the upper part which consists of a metal tube 10. The bottom end of this tube 10 fits into the ring 9, and the top end is bolted to the bridge-duct 11, by means of an angle-iron flange 12, establishing connection with air-jackets 3 and thus continuous communication between a fan or other source of air pressure, which may be of any old or well known type and which is not shown as it does not form a part of the invention, through inlet 76 and ashpit. The apparatus is erected adjacent to the boiler (not shown), a flue 13 connecting the ignition chamber with the combustion chamber of the boiler furnace. The air for combustion enters the furnace through an opening 76 at the side of the furnace.

The ignition chamber is divided into two compartments by the erection of two vertical fire-brick walls 14, (see Figure 4) commencing at a line sufficiently above the fire-grate 2 to ensure the free working of the movable fire-bars 16, and rising right up against the bottom floor of the desiccator. Recesses in the centre air flue-bricks 5, and in the brick lining 4 protecting the ignition chamber jackets 3, receive the side ends of the partitioning walls 14, thus effectively separating the fire in the smaller compartment from that in the larger. The air for combustion is forced into both compartments through the fire grate 2 and through the perforations 15 in the wall of the lower section of the centre air flue 5. The larger compartment is in direct communication with the combustion chamber of the boiler furnace (not shown), whereas the gases produced in the smaller compartment (which is opposite to the flue opening with the centre air flue 5 in between) have to pass through the desiccator before reaching the larger compartment on their way to the combustion chamber. They enter the desiccator through the apertures in that section of its bottom floor, covering the smaller compartment and leave through the apertures in the remaining section which forms the roof of the larger compartment. The presence of the wet fuel intensifies the current of gases through the desiccator and complications in the draught arrangement cannot occur.

The hot gases from the smaller compartment in the ignition chamber on entering the desiccator come into intimate contact with the wet fuel, and the heat given up by the gases is absorbed by the fuel. The cooling effect increases the density of the gases which descend readily through the apertures in the bottom floor in the desiccator immediately above the larger compartment of the ignition chamber into the said compartment on their way to the boiler, and again the cooled gases shrink in volume thus forming a partial vacuum in the desiccator which really intensifies the current of gases from the smaller compartment into the desiccator. In other words the established furnace draught induces the cooler and thus heavier gases to readily follow whilst the hot gases from the fire take up their space in continuation of the cycle thus formed.

The ratio of division depends entirely upon the moisture content of the fuel. With megass for instance, containing 50% of moisture and having a thermal value of 3780 B. t. u. per pound, a ratio of 1:6 must be adopted, as it requires 630 B. t. u. or exactly one sixth of the total heat value available, to evaporate the contained water and convert it into superheated steam of 600° F., the usual waste heat gas temperature.

A fire gate 2 separates the ignition chamber from the ash pit. It is of circular shape constructed entirely of cast iron, and fitted with stationary bars 2 and movable bars 16. The former are in singles, flat, with radial sides and are carried by two rings 17 and 18. The outer ring 18 is let into the brick wall of the ash pit and the centre ring 17 is cast on to the socket 7 of the air flue, with short, rectangular blocks intervening. Both rings 17 and 18 are provided with notches spaced to leave an aperture of about one inch in width between the bars 2 when placed in operative position. The movable bars 16 covering these apertures, are cast spokewise on to a ring 19, which moves on steel balls (not shown), embedded in the above mentioned intervening rectangular blocks.

Figure 7:
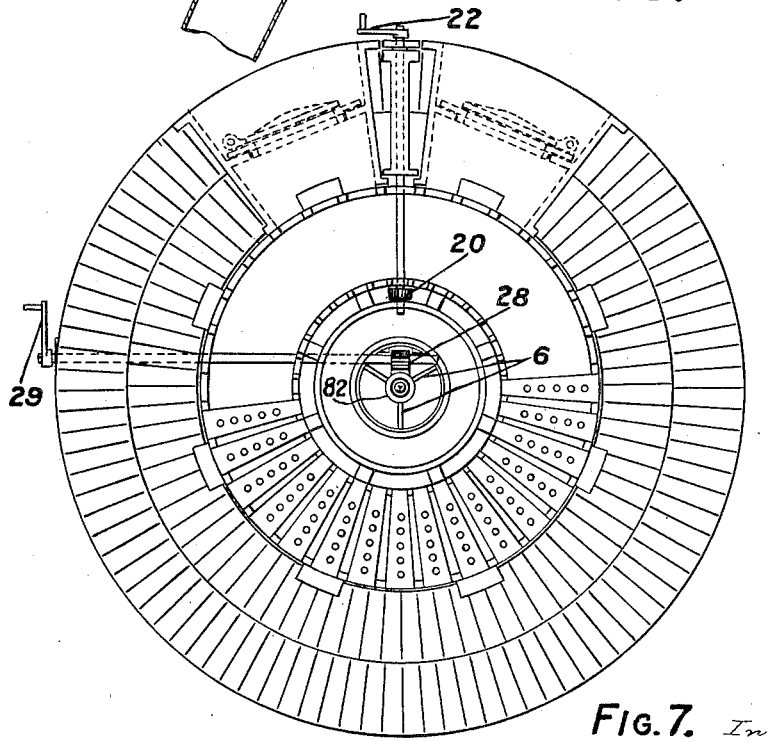
Figure 7 is a section immediately above the fire bars.

Four teeth cast on to the bottom of the ring 19 and a bevelled pinion wheel 20 with an equal number of teeth and fitted on to a spindle 21 extending through the brickwork 4 to the outside of the furnace provide the movement desired to shift the covering bars 16 from one aperture on to the next and back again (see Figure 7). This movement is sufficient to wipe the ash off the stationary bars 2 and drop it into the ash pit. The spindle 21 passes through a stuffing box and is provided with a crank handle 22 moving between stops (not shown), to ensure a proper covering of the apertures by the movable bars 16, when stationary. The pedestal 82 which supports the whole of the axially disposed structure is a substantial iron casting, standing on a concrete pillar 23. It is composed of a cylinder 52 of essentially the same diameter to that of the centre air flue 5, it being really a continuation of it. Cast on, radially to the outside wall of the cylinder are three ribs 6 upon which the socket 7 of the centre air flue 5 sits. These ribs 6, flat bars of rectangular cross section, extend over and above the rim of the cylinder 52 to provide an outlet for the air for combustion into the ash pit; another cylinder 53, but of smaller diameter and of only half the height of the surrounding one, and joined to it by radial ribs 54 also, makes up the middle portion of the pedestal. It serves as a socket for a wrought steel tube 24 which forming the axis of the pedestal 6 acts as a guide bar for the valve 25, controlling the volumes of air admitted for combustion above and below the fire grate respectively. The valve 25 consists of a hollow metal cone with a sleeve 26 attached in the centre of its base as a guide. Its apex is directed towards the incoming column of air, effecting a smooth and evenly distributed flow into the ash pit. Rack 27 and pinion 28 are the moving factors. The rack 27 is cast on to the sleeve 26 and the pinion 28 is keyed to a long shaft (see Fig. 7) and operated by means of a crank handle 29 from the outside.

The valve 25 moves vertically up and down and its movement is confined within the space representing the air outlet. The result of moving the valve 25 in an upward direction will be a diminution of the air supply below the grate with a corresponding increase of air volume entering the furnace above the grate (through the perforations 15 in the wall of the lower section of the centre air flue 5). As the movement is restricted to less than one full turn of the crank handle 29, the position of the valve 25 can readily be ascertained from the disc (not shown) fastened to the stuffing box. A number of holes are drilled on a circle in the disc, each hole denoting a certain position of the valve 25. The insertion of a peg (not shown) will prevent the crank handle 29 from flying back, thus the valve 25 must remain in the position, as the weight of the valve 25 does not allow the crank handle 29 to move in the opposite direction.

Figure 3:
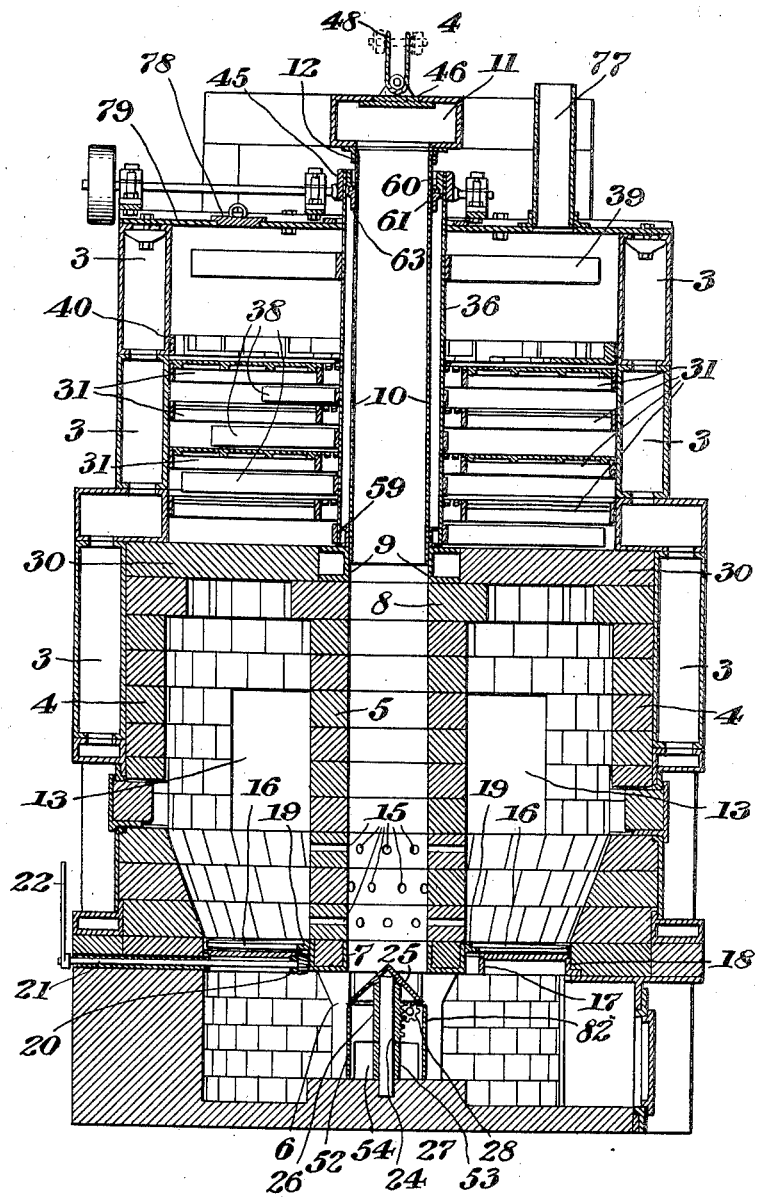
Figure 3 is a front sectional elevation.
Figure 8:
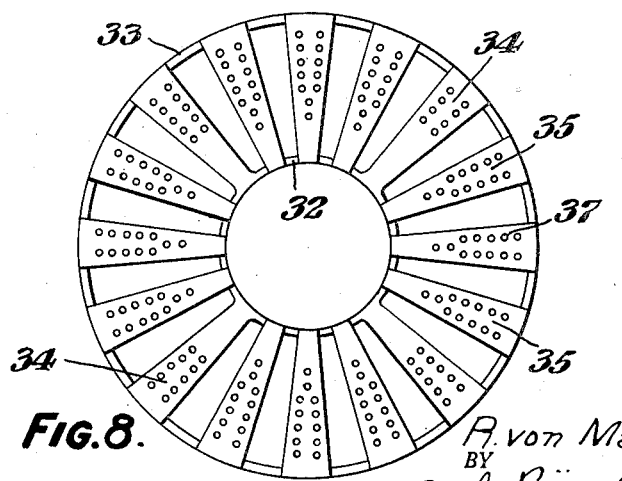
Figure 8 is a detail plan of a desiccator floor.
Figure 6:
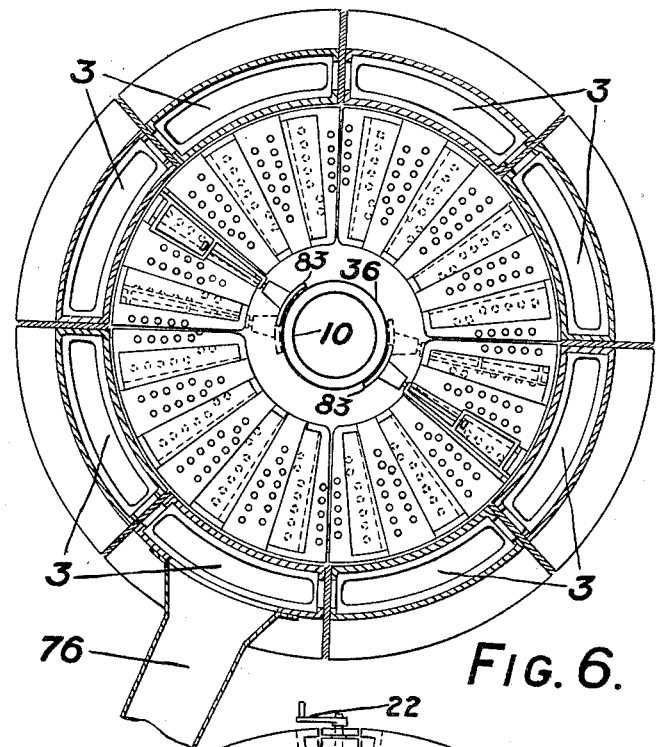
Figure 6 is a section through the desiccator.

The megass with its large content of moisture is fed continuously into the chute 1 at the top of the desiccator, necessitating a continuous discharge through the apertures in the bottom floor 30 of the desiccator into the furnace. The period of drying the megass is thus limited to the time taken up by its passage through the desiccator. Consequently means had to be devised to retard the passage through the desiccator and also to ensure a thorough exposure of each and every particle of megass to heat. The fuel is put through the desiccator entirely mechanically and the passage retarded by a number of stages, usually six, built into the desiccator. These stages or floors 31 are constructed of cast iron with the exception of the bottom floor 30, which is built with blocks of fire resisting material. Each of the cast iron floors 31 (see Figure 8) is composed of a frame, made up by two concentric rings 32 and 33 connected by four radial bars 34, and a number of plates or trays 35. Both rings 32 and 33 are provided with corresponding notches, to receive the ends of the trays 35, which, when placed, leave radial apertures between them. The trays 35 are flat perforated bars 37 with radial sides, and are so much wider than the apertures, to prevent spilling of the megass, which is moved from floor to floor by scrapers 38 (see Figures 13, 14, 15 and 16) secured to the rotating tube 36. Two scrapers 38, on opposite sides, work along each floor 31, thus cleaning the floor twice with each rotation. The floor frames, being rigid, are safely supported with the outside ring resting on the heads of special bolts (not shown) fastened in the walls of the desiccator jackets 3, leaving a clear path for the rotating scrapers 38. The diameter of the inner ring 32 (Figure 8) of the floor frames 31 (Figure 3) exceeds that of the rotating tube 36 plus the height of the brackets 83 (Figure 6), bolted to the opposite sides of the tube 36, and carrying the scrapers 38. By this proportioning of the parts it becomes possible to withdraw the tube 36 from the desiccator without disturbing the floors, if desired, for making repairs.

The four bars 34 connecting the two rings 32 and 33 and thus making up the frame, are of such shape that they take the place of trays 35, and a floor with 16 trays would require only 12 loose trays 35 to complete it.

The floors 31 are built into the desiccator with an equal distance between them, excepting the distance between the top floor and the second floor which is less. The fuel, as it is fed into the desiccator, falls or drops in a heap on the first floor 31 and is spread out by means of four rectangular shaped metal blades 39 fastened to the rotating tube 36. These spreaders 39 rotate in a circle not less than 15 inches above the top floor 31 in order to form a layer (of megass) of sufficient thickness to effectively seal off the furnace gases against the atmosphere.

The second floor 31 with its trays 34 and 35 arranged immediately below the apertures in the first floor 31 (the radial centre line of the trays 35 in the second floor 31 being vertically below the radial centre line of the apertures in the top floor 31 (see Figure 6) is supplementary to the first floor 31. It stops the fall of the fuel through the apertures in the first floor 31, simultaneously dividing the mass of fuel into small and equal portions, which remain separated on their way down into the furnace.

To prevent the fuel from rolling down sideways (over the edges of the trays 34 and 35 in the second floor 31) the apertures in the top floor 31 are boxed in with flat radial bars 84, cast on to the floor frame. The top edges of these bars are flush with the radial sides of the trays 35, and the bottom edges are in line with the bottom of the floor frame. The reason for this boxing-in the various apertures in the top floor 31 with flat radial bars 84 is to shorten the sides at the angle of repose 81 of the material while still preventing the fuel from rolling down sidewards (see Figure 18).

The open space between the first and second floor is thus reduced in height; providing this height is not more (preferably less) than the difference between the average width of aperture and tray, spilling of fuel, such as green megass does not occur. The scrapers 38, rotating in this space, are of the one blade type.

Employing double bladed scrapers will allow of a further reduction in height of the open space between the first and second floors as with blades, corresponding to the radial sides of the trays, same are cleaned off twice in succession. With blades only half as far apart as the radial sides of the trays, or corresponding with the radial centre line of a tray and one radial side, the tray will be cleaned off one and a half times. The relative position of the third floor to the second, and generally of every floor below the second floor to the one immediately above, is determined when the radial centre lines of the trays in the lower floor are (allowing for the inertia of the falling megass) slightly (approximately one inch) in advance to the edges of the trays immediately above, over which the fuel is dropped.

It is essential that no particles of fuel can lodge in the desiccator for a longer period than that allotted for the purpose of drying, otherwise ignition and consequent combustion will take place in the desiccator.

As mentioned previously, the bottom floor 30 in the desiccator is constructed with blocks of fire resisting material and a comparatively wide ledge is formed between the rotating tube 36 and the narrow ends of the apertures. Fuel spilled over the inner rim of the floors drops on to this ledge, remaining there unless provisions are made for it being cleared off. This has been done by curving a piece of flat iron bar 55 (see Figure 10) into a section of a circle with a diameter equal to the distance between the narrow ends of opposite apertures; it is fastened on to the rotating tube 36 at one end. Rotating, the free end describes a circle with the narrow ends of the apertures in its periphery. Sweeping the whole width of the ledge, the fuel is moved in a direction radiating from the centre until it reaches the near edge of apertures, falling through in equal lots.

Similar measures have been taken with regard to the fuel lying undisturbed on the top floor 31, although here the chances of ignition are remote. The ledge on this floor is formed by the flat, perforated metal ring 57, covering the space between the rotating tube 36 and the inner ring 32 of the floor frame. The fuel (at least the lower portion of it) lying on this ledge and on the floor plates or trays 34 and 35, remains stationary, the moving portions being those immediately above the apertures and held up by the trays 34 and 35 in the second floor. The intention is to disturb the lowest strata of the stationary fuel, that is the portions in immediate contact with the hot plates 34 and 35 and through the perforations 37 with the hot gases from the furnace by shifting same on towards the apertures and partly mixing same with the still green portions of the fuel. For this purpose a contrivance 58 (see Figure 9) similar to that for cleaning the spilled fuel off the ledge in the bottom floor 30 is employed, the only difference being, that a thin, round or square iron bar is used in its manufacture instead of a flat iron bar and, that the free end of the curve is drawn out radially into a straight length, extending to the outer rim 33 of the floor 31. The curved part 56 moves the particles of fuel in a radial direction towards the apertures, whereas the straight part 58 sweeps the radial floor plates 34 and 35. The work performed by this contrivance 58 is greatly facilitated by the presence (or existence) of small cavities in the layer of fuel immediately above the radial plates 34 and 35 in the top floor. These cavities are caused by the cover plates 43 and 44 of the fuel distributing regulator (see Figure 17), which is located on the top floor and separated from it only by the space required for the rotating slicer. Its function is limited to the control of the distribution of the fuel into the two respective compartments in the ignition chamber, and is therefore only used when the moisture contents vary. With fuel possessing a constant percentage of moisture the regulator will remain in its neutral position. When in that position all the apertures (in the top floor) are totally unobstructed, allowing a maximum quantity of fuel to enter into the drying zone.

The ignition chamber has been conveniently divided into two compartments. The heat produced in the smaller compartment is utilized solely for the drying of the fuel, whereas the heat generated in the larger compartment represents the net thermal value. An increase of moisture necessarily means a decrease in thermal value thus it follows that the quantity of fuel to be admitted into the larger compartment must be lessened. On the other hand a reduction in the percentage of moisture will mean that a lesser amount of fuel will have to be burned in the smaller compartment.

Figure 1:
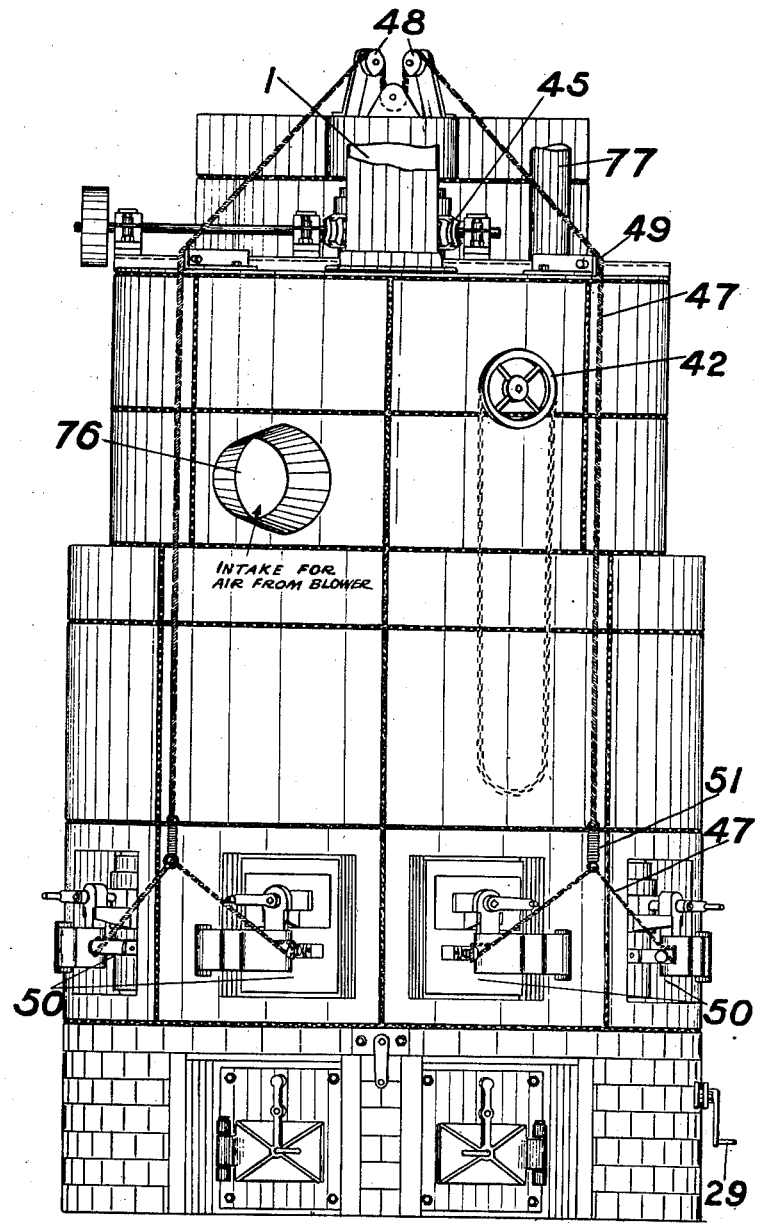
Figure 1 is a front elevation of the apparatus.

A metal tyre 40, fitting loosely inside the desiccator and supported on three pins 85 fastened in the inner jacket walls 3, is connected by two short length of chains 41 (Fig. 17) with the crank of a horizontal shaft, revolving in the bore of a pipe 86, which pierces the jacket 3 radially and has its ends welded in the walls of the jacket 3. A hand chain wheel 42 (see Figure 1) is fitted to the outside end of the shaft; the movement of the crank is limited to a quarter turn each way from the neutral point, that is from its vertical position. Secured to the inside of the tyre 40 are a number of steel plates 43 corresponding with the number of apertures in the floor. Their dimensions are about half of those of the floor plates, it being considered sufficient to control the wider part of the apertures only. The plates 43 are so arranged on the tyre 40, that all apertures are left fully open, when the regulator is in its neutral position.

Each compartment in the ignition chamber received its portion of fuel through its respective aperture in the top floor, thus automatically dividing the circle of apertures into two distinct sections. The movement of the regulator being reciprocating, the plates 43 intended for the obstruction of the apertures in the left section must cover the left halves of the floor plates 34 and 35 immediately below them, and those controlling the apertures in the section on the right must be exactly above the right halves of the floor plates. Thus there are two plates or one 44 of double size immediately above the floor plates between the commencing sections of apertures, and none above that between the ending sections. The operation is simple; a quarter turn of the handwheel 42 moves the regulator from its neutral position into one partly closing the apertures in the one section, leaving the apertures in the other section unobstructed. The regulator plates 43 and 44 are still immediately above the floor plates 34 and 35 having shifted merely from the one half over the floor plate on to the other.

Figure 5:
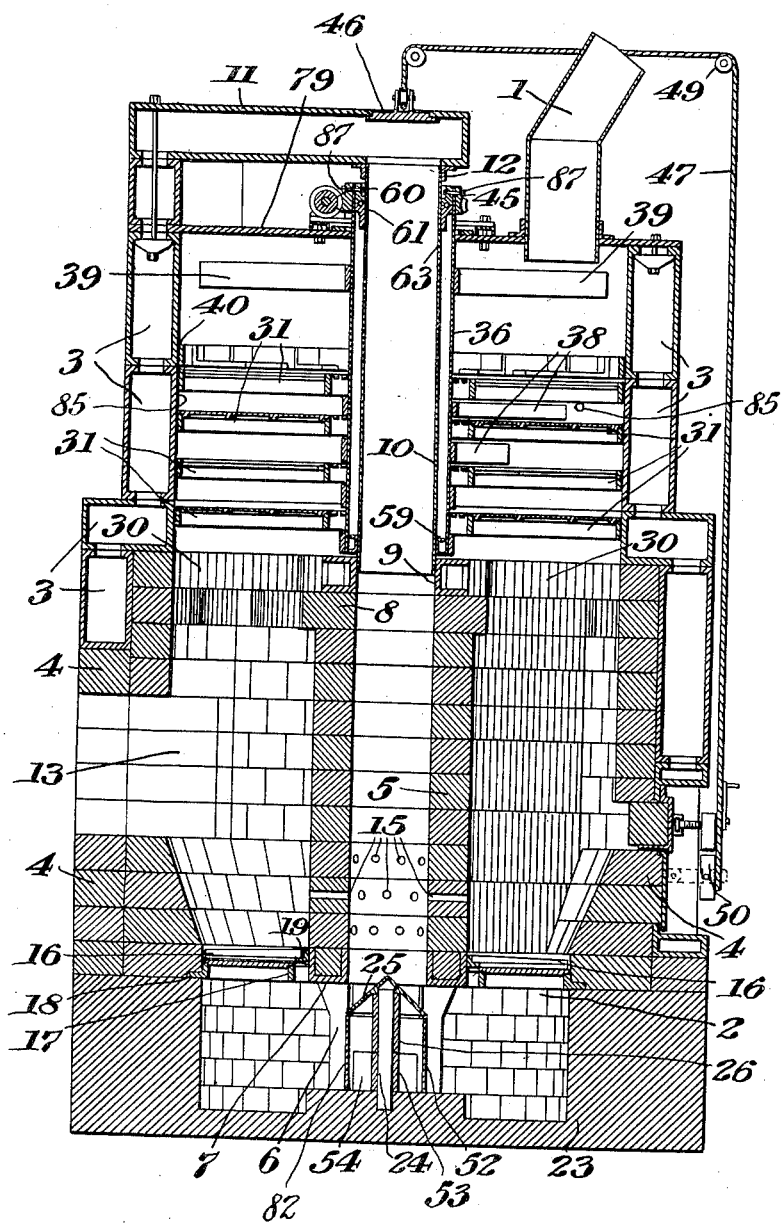
Figure 5 is a side sectional elevation.

The axially disposed metal tube 10 (see Figures 3 and 5) in the desiccator renders a double service by providing a passage way for the air for combustion and by serving as a pivot for the surrounding tube 36, rotated by means of the worm gear 45 at the top of the tubing 36 above the cover plate 79. Supported by a metal ring 59 (of U cross section) fastened near the bottom end, it is resting on the heavy cast iron ring 9 forming the joint between the metal and the fire proof section 8 of the central flue. It is firmly held in position at the bottom by the protruding part of the tube, fitting inside the bore of the joint ring 9, and at the top by an angle iron flange 12, bolted to the bridge duct 11. Another metal ring 63 is secured near the top end, about 6 inches from it, whereon the surrounding tube 36 is suspended and rotated. It represents the bearing for the rotating tube 36, and the parts belonging to it, that is the part revolves on it, also a ring 60 and of similar cross section is bolted to the inside wall of the rotating tube 36. Both rings are grooved, and fitted with a ball race 61. The worm wheel 45 is fastened to the outside at the tube 36 by the same bolts 87, which hold the top bearing ring 60 in position, and both worm gear 45 and bearing are above the top cover of the casing and away from heat.

The scrapers 38 (shown in detail in Figures 13, 14 and 15) working between the second floor 31 and bottom floor 30 belong to the two blade type and are made of cast iron. The blades are apart, corresponding with the radial edges of the trays 34 and 35 and are connected by two cross bars 62. The first or front blade 67 is of only half the length of the back blade 64, which extends right across the full width of the floor, that is the full length of the trays. A third bar 65 is cast on to the end of that part of the back blade 64, not connected with the front blade 67. It contains a bore, as does the middle cross bar 62, the bores being in the radial centre line of the scraper; the three cross bars 62 and 65 form right angles with the radial centre line. When mounted on the pipe 66, which passes through the bores in the cross bars the back blade 64 being heavier than the front blade 67, the scraper is in a slanting position, with the front blade 67 elevated, that is, its bottom edge will be about one inch off the floor plates, and with the back blade 64 almost touching the floor plate with its bottom edge. The shoulder 80 cast on to the middle cross bar 62 will be hard up against the pin 68 inserted into the pipe 66, before the back blade 64 can come into actual contact with the floor plates 34 and 35. The pipe 66 whereon the scrapers are mounted fits into the socket of a bracket, securely fastened to the rotating tube 36.

The scraper is self adjusting; riding loosely on the pipe 66, its efficiency is not impaired by unevenness of the floor or other slight distortions of the iron work in the desiccator. Another important feature of its construction is that the fuel is not merely scraped off the tray on its passage through the desiccator, but turned over as well.

Approaching the heap of fuel on the tray the front blade 67 of the scraper pushes off the top portion, the back blade 64 scraping off the remainder. Thus the upper part of the heap, falling down first, is covered up by the bottom lot following it. This process of turning over each individual heap, while in process of being moved, is repeated on each floor 31, resulting in rapid and uniform evaporation of the contained water in the fuel. The scrapers 38 are set ahead from top to bottom (see diagrammatic view Figure 16); the moment a tray is emptied it is being loaded again by the action of the scraper, working along the floor above.

After passing through the jackets 3 the air for combustion enters the central flue on its way into the furnace by means of a duct 11 bridging the worm gearing 45. Its shape is essentially that of a sector with its vertex rounded and somewhat enlarged to correspond in size with that of the cross section of the fixed tube, on which it rests. The wide part or arch of the bridge duct 11 is supported on a jacket, at a height equal to the distance the fixed tube 10 extends above the closed top of the desiccator casing. The circular opening on top of the bridge duct 11 vertically above that leading into the fixed tube 10 is fitted with a valve 46, for the purpose of interrupting or breaking the current of air into the furnace. It consists of a circular disc with a loose sheave bracketed to it at the top, and is operated by a steel rope 47 or chain, running under the sheaves. A light structure over the opening carries two more loose sheaves 48, one on each side; the rope 47 passing over these sheaves 48 suspends the valve 46. Rollers 49 (Figure 1) guide the rope 47 over the edge of the desiccator casing, and the ends are fastened to the catches of the fire doors 50 with the result that the doors 50 cannot be opened, without first shutting off the supply of air, releasing the pressure in the ignition chamber, and that the plenum cannot be restored in the ash pit unless the ends of the rope 47 are slipped over the nose of the door catches, once the doors 50 are closed again. A spring 51 inserted near each end of the rope 47 gives it elasticity and helps in holding the rim of the disc of valve 46 firmly against the surrounding surface of the opening in the top of the bridge duct 11. The valve 46 is then shut, the doors 50 are closed, the rope ends 47 fastened to the door catches stretching the rope 47 tightly, and a full supply of air is entering the furnace. Preparatory to opening a door 50, the rope end 47 is taken off the catch, resulting in a slackening of the rope and a consequent dropping of the valve 46, which is then open. In that position, the disc covers the open end of the fixed tube 10, preventing the entrance of air into the furnace and allowing it to escape into the atmosphere, or in case of more than one unit operating, turning the air current into a branch leading to the other units.

The apparatus is equipped with not less than three doors 50, in order to give access to every portion of the ignition chamber and to facilitate cleaning operations. They are set in niches formed by the respective jackets 3 being pierced by prisms with quadrilateral bases and radial side faces. The advantages of small doors without sacrificing accessibility has been gained by employing a door frame 70 which is fastened to the rim surrounding the rectangular hole in the inner wall of the jacket 3, by means of stud bolts. The frame consists of a plain cast iron plate with an opening for the door; it is easily removed in case of a person requiring to enter the furnace for the purpose of effecting repairs. The door is mounted on a heavy hinge and held up by a screw 71 passing through a nut which revolves on a pin inserted at the end of the hinge 72. The head of the screw fits into a collar 73 cast on to the door 50. The screw 71 is worked by means of the crank handle 74 attached to it, and the manipulation of closing and opening the door is carried on with ease, ensuring an air tight fit and permitting an effective lining of the door as a protection against the furnace heat. Immediately below the collar 73 for the screw head, two bars 75 of rectangular cross section are cast on to the door, sufficiently apart to allow the lower portion of the swivel nut to pass between them. The inner side faces of the guide bars 75 are touching the vertical sides of the nut, thus the door cannot dip sideways. Sagging of the door 50 is prevented by the top edges of the bars 75 being hard up against the shoulders provided for this purpose on the nut.

Probably the most striking feature in the construction of the furnace doors is the protection afforded to the operator or attendant against the heat radiating from the hot brick lining 69 of the fire door by enabling him to swing the door around and turn in the hot side of it away from him. (See Figure 19.)

An outlet pipe 77 is provided for escape of vapor formed above the layer of fuel on the top floor, and an observation hole 78 is mounted at the top of the casing. The desiccator is covered in by a cast iron plate 79.

I claim:

1. Apparatus for burning wet fuel such as megass, comprising in combination an air-jacketed desiccator chamber; an air-jacketed ignition chamber below same; means in said desiccator chamber for progressively delivering dried fuel to said ignition chamber; a fire grate at the bottom of said ignition chamber; a subsidiary compartment in said ignition chamber and having communication therewith through the desiccator chamber; a closed pit below said fire grate and an axial hollow flue extending from said pit to the top of the desiccator chamber adapted to be connected to a source of air under pressure, said flue having a series of passages communicating with the ignition chamber and said subsidiary compartment, and having means operative therewith for controlling the air admitted for combustion above and below the fire grate.

2. An apparatus according to claim 1, in which the desiccator chamber comprises a cylindrical casing and an inlet chute said casing having a series of vertically spaced floors, the bottom floor being of fire-resisting material; a plurality of rotatable scrapers located between said floors; a tube rotatably suspended about the axial flue and adapted to carry said scrapers; and radial apertures in said floors through which the fuel is progressively fed by the action of the scrapers, and discharge apertures in the bottom floor to deliver the fuel to said ignition chamber.

3. An apparatus according to claim 1, which includes fire doors and means for automatically shutting off the supply of air and releasing the pressure in the ignition chamber preparatory to operating said doors; said means comprising a valve at the top of the arial flue and a spring-tensioned cable operatively connecting said valves and said doors.

4. Apparatus for burning wet fuel such as megass, comprising in combination an air-jacketed ignition chamber; an air-jacketed desiccator chamber thereabove, said desiccator chamber having a cylindrical casing, an inlet chute and a series of vertically spaced floors therein, the bottom floor being of fire-resisting material; a plurality of rotatable scrapers located between said floors; an axial flue in the desiccator chamber adapted to be connected to a source of air under pressure; a tube rotatably suspended about the axial flue and adapted to carry said scrapers; a top floor; spreaders located a predetermined distance above the said floor and operative to maintain a layer of megass above the said floor to form a seal against the atmosphere; radial apertures in the said floors through which fuel is progressively fed by the action of the scrapers; and discharge apertures in the bottom floor to deliver the fuel to said ignition chamber.

5. Apparatus for burning wet fuel such as megass, comprising in combination an air-jacketed ignition chamber; an air-jacketed desiccator chamber thereabove, said desiccator chamber having a cylindrical casing, an inlet chute and a series of vertically spaced floors, the bottom floor being of fire-resisting material; a plurality of rotatable scrapers located between said floors; an axial flue in the desiccator chamber adapted to be connected to a source of air under pressure; a tube rotatably suspended about the axial flue and adapted to carry said scrapers; radial apertures in the said floors through which fuel is progressively fed by the action of the scrapers; discharge apertures in the bottom floor to deliver the fuel to said ignition chamber; and means for removing excess fuel from the bottom floor, consisting of a scraper operative with the rotatable tube, said scraper being shaped into a section of a circle having its diameter equal to half the distance between the narrow ends of opposite apertures in said floor, plus the radius of the rotating tube.

6. Apparatus for burning wet fuel such as megass, comprising in combination an air-jacketed ignition chamber; an air-jacketed desiccator chamber thereabove, said desiccator chamber having a cylindrical casing, an inlet chute and a series of vertically spaced floors, the bottom floor being of fire-resisting material; a plurality of rotatable scrapers located between said floors; an axial flue in the desiccator chamber adapted to be connected to a source of air under pressure; a tube rotatably suspended about the axial flue and adapted to carry said scrapers; radial apertures being provided in the said floors through which fuel is progressively fed by the action of the scrapers; discharge apertures being provided in the bottom floor to deliver the fuel to said ignition chamber; and means for removing undisturbed fuel on the top floor, said means consisting of a slicer rotated by said rotatable tube, said slicer being shaped into a section of a circle equal to half the distance between the narrow ends of opposite apertures in the said floor, plus the radius of the said rotatable tube and having the free end thereof drawn out radially into a straight length extending to the outer rim of the floor.

7. Apparatus for burning wet fuel such as megass, comprising in combination an air-jacketed desiccator chamber; an air-jacketed ignition chamber therebelow; a subsidiary compartment being provided in said ignition chamber and having communication therewith through the desiccator chamber; said desiccator having a cylindrical casing, an inlet chute, said casing having a series of vertically spaced floors therein, the bottom floor being of fire-resisting material; a plurality of rotatable scrapers located between said floors; an axial flue in the desiccator chamber adapted to be connected to a source of air under pressure; a tube rotatably suspended about the axial flue and adapted to carry said scrapers; radial apertures being provided in the said floors through which fuel is progressively fed by the action of the scrapers; discharge apertures being provided in the bottom floor through which the fuel is delivered to said ignition chamber; means for controlling the distribution of fuel into the respective compartments of the ignition chamber, said means consisting of a metal tyre loosely fitting inside the desiccator chamber; means for supporting said tyre and means for manual operation thereof; a plurality of floor plates mounted on said tyre and corresponding in number with the apertures in the floor, said plates being so arranged that all apertures are open when the controlling means is in neutral position; and having one double-sized plate immediately above the floor plates between the commencing sections of the apertures, the space between the ending sections being open.

8. Apparatus for burning wet fuel such as megass, comprising in combination an air-jacketed ignition chamber; an air-jacketed desiccator chamber thereabove, said desiccator chamber having a cylindrical casing, an inlet chute, said casing having a series of vertically spaced floors therein, the bottom floor being of fire-resisting material; a plurality of rotatable scrapers located between said floors; an axial flue in the desiccator chamber adapted to be connected to a source of air under pressure; a tube rotatably suspended about the axial flue and adapted to carry said scrapers; each of said scrapers comprising longitudinal blades radially disposed relative to each other and integrally connected by cross bars, the front blade being half the length of the back blade; a third cross bar integral with the back blade; alined bores being formed in the third and center cross bars in the radial center line of the scraper; a pipe secured to the aforesaid rotatable tube and mounted in said bores to permit swinging movement of said scraper; a shoulder cast on the middle cross bar and means on said pipe to secure the same in the cross bar and operative with the shoulder to limit movement of the scraper.

In witness whereof I have hereunto signed my name this 31st day of October, 1928.

RUDOLF von MATTEKOVICH.